(12) United States Patent
Qiu et al.

(10) Patent No.: US 12,251,996 B2
(45) Date of Patent: Mar. 18, 2025

(54) EXTERNAL ROLL COVER

(71) Applicant: ZHEJIANG SURPASS AUTO PARTS CO., LTD., Zhejiang (CN)

(72) Inventors: Lei Qiu, Zhejiang (CN); Lei Chen, Zhejiang (CN)

(*) Notice: Subject to any disclaimer, the term of this patent is extended or adjusted under 35 U.S.C. 154(b) by 269 days.

(21) Appl. No.: 17/978,343

(22) Filed: Nov. 1, 2022

(65) Prior Publication Data

US 2024/0140179 A1    May 2, 2024

(51) Int. Cl.
 *B60J 7/12*    (2006.01)

(52) U.S. Cl.
 CPC ........... *B60J 7/1291* (2013.01); *B60J 7/1204* (2013.01)

(58) Field of Classification Search
 CPC ....... B60J 7/1291; B60J 7/1204; B60J 7/104; B60J 7/102; B60J 7/141; B60J 7/198; B60J 7/185; B60J 7/10; B60J 7/068; B60J 7/085; B60P 7/04; B60P 7/02
 USPC ........... 296/100.18, 100.17, 100.02, 100.07, 296/100.06, 100.09, 100.08, 100.12, 296/100.01, 100.14, 100.15, 100.16, 98
 See application file for complete search history.

(56) References Cited

U.S. PATENT DOCUMENTS

| | | | | |
|---|---|---|---|---|
| 4,518,193 A * | 5/1985 | Heider | ...................... | F24S 40/10 220/350 |
| 4,923,240 A * | 5/1990 | Swanson | .................. | B60J 7/104 296/100.18 |
| 5,251,951 A * | 10/1993 | Wheatley | .................. | B60P 7/04 296/100.18 |
| 7,497,493 B1 * | 3/2009 | Thiessen | .................... | B60P 7/15 296/3 |
| 7,828,361 B1 * | 11/2010 | Spencer | ...................... | B60J 7/10 296/100.18 |
| 8,146,981 B2 * | 4/2012 | Huotari | .................... | B60J 7/068 296/100.18 |
| 8,814,249 B2 * | 8/2014 | Rossi | ...................... | B60J 7/102 296/100.18 |
| 9,731,584 B2 * | 8/2017 | Hannan | .................... | B60J 7/068 |
| 9,914,344 B1 * | 3/2018 | Stull | ...................... | B60J 7/1204 |
| 10,322,624 B2 * | 6/2019 | Facchinello | ............ | B60J 7/106 |
| 10,538,150 B2 * | 1/2020 | Zichettello | ............... | B60J 7/068 |
| 10,668,794 B2 * | 6/2020 | Xu | ............ | B60J 7/104 |
| 2018/0086190 A1 * | 3/2018 | Yue | ......................... | B60J 10/30 |
| 2018/0118004 A1 * | 5/2018 | Schmeichel | ............ | B60J 7/141 |

* cited by examiner

*Primary Examiner* — Amy R Weisberg
*Assistant Examiner* — Veronica M Shull

(57) ABSTRACT

The invention discloses an external roll cover for a pickup truck, including a layer of leather and a supporting frame, the layer of leather is connected to the cargo hopper through a supporting frame, the supporting frame includes a front rail assembly, a rear rail assembly and a side rail assembly, the front rail assembly is connected to the rear rail assembly through a side rail assembly, the front rail assembly includes a front rail, a front rail joint and a front rail rubber strip, the front rail is connected with the side rail assembly through a front rail joint, the front rail is connected with a front rail rubber strip, the front rail joints are connected at both ends of the front rail, the front rail rubber strip is stick on the bottom of the front rail. The front rail strip is very long, which can play a good waterproof effect.

10 Claims, 15 Drawing Sheets

EXTERNAL ROLL COVER

TECHNICAL FIELD

This invention is relevant to automobile accessories, especially an external roll cover for a pickup truck.

BACKGROUND TECHNOLOGY

The rear cargo hopper of the pickup truck (also known as a sedan truck) is often used to carry goods. Since the rear cargo hopper is open, people invented the roll cover to avoid wetting the goods in the rear cargo hopper in rainy and snowy weather. Install the roll cover on the pickup truck's rear cargo hopper and use the cover to prevent the goods in the rear cargo hopper from getting wet by rain.

The structure of current roll bed-cover is as follows, the layer of leather is connected with the cover frame by Velcro. The vast majority of covers on the market are external covers, which are poorly matched with the rear cargo hopper. Moreover, the installation of the clamp is complicated. The type of the clamp need to be matched according to different car bodies; which makes the installation and production of clamps difficult and high costs. In addition, the clamp is easy to install obliquely, which affects the locking tongue movement, and the leather of the roll cover will be loose after a long time used, affect the aesthetics of the car cover.

ABOUT THE INVENTION

The purpose of the present invention is to provide an external roll cover for a pickup truck, the technical solution adopted in the present invention is as follows:

An external roll cover for a pickup truck, includes a layer of leather and a supporting frame, the layer of leather is connected to the cargo hopper through a supporting frame, the supporting frame includes a front rail assembly, a rear rail assembly and a side rail assembly, the front rail assembly is connected to the rear rail assembly through a side rail assembly;

The front rail assembly includes a front rail, a front rail joint and a front rail rubber strip, the front rail is connected with the side rail assembly through a front rail joint, the front rail is connected with a front rail rubber strip.

The side rail assembly includes a side rail and a Velcro.

The front rail joints are connected at both ends of the front rail, the front rail rubber strip is stick on the bottom of the front rail. The front rail strip is very long, which, can play a good waterproof effect The rear rail assembly includes a rear rail and a rear rail joint, the bottom of the rear rail is connected with a rear rail rubber strip, both ends of the rear rail are respectively connected with a rear rail joint, the rear rail joint is connected with a locking assembly, the locking assembly includes a locking tongue, a pulling rope, a roller fixing block, a roller and a steel wire. The roller is connected, to the rear rail through the roller fixing block, both ends of the steel wire are respectively connected with a locking tongue, the steel wire wound around the roller, the steel wire is sleeved with the pulling rope, the rear rail assembly is connected with the side rail assembly through the fixing adjustment assembly.

Further, there are two rollers and two'pulling ropes, the two pulling ropes are arranged between the two rollers, the two rollers guide the installation path of the steel wire to make the steel wire more concealed, the roller and the roller fixing block are rotationally connected, which means, when the steel wire is moving, it will drive the roller to rotate accordingly, so as to avoid friction generated between the steel wire and the roller, greatly extending the service life of the steel wire. In addition, although two pulling ropes are provided, any one can be pulled during use. One side of the locking tongue is designed as a inclined plane, by setting the locking tongue, steel wire and pulling rope, the pulling rope drives two locking tongues to shrink simultaneously through the steel wire, which can open the rear rail assembly. When closed, only need to press the rear rail assembly. Because the lower part of the lock bolt is a lock tongue inclined plane, when the lock tongue inclined plane contact the side rail, it will press the locking tongue back; the locking tongue crosses the side rail, then extends under the action of the spring to lock the rear rail assembly. By setting the roller and making the steel wire wound around the roller, the installation position of the steel wire is limited, making the steel wire closer to, the rear rail, which is not only beautiful, but also convenient to use. By setting the roller fixing block, the roller is fixed on the rear rail to prevent the roller from sliding freely, the rear rail joint is provided with a screw hole position for fixing the rear rail joint screw. The rear rail joint screw are respectively connected with the rear rail and the locking tongue. The pulling rope drives the steel wire to pull the rear rail joint screw through the roller to drive the locking tongue. When the roll cover is closed, the lock tongue inclined plane snaps into the locking tongue contact part of the side rail. Because of the spring in the rear rail joint, the locking tongue retracts into the rear rail joint and then protrudes out and snaps into the side rail. At the same time, the convex portion engaged with the upper cover concave. When the rear rail pulling rope is pulled, the locking tongue is retracted into the rear rail joint, and the convex portion leaves the upper cover concave, thereby opening the car cover and realizing the opening and closing of the car cover.

Further, the rear rail assembly is connected with a fixing adjustment assembly, the fixing adjustment assembly includes a fastener upper cover and a fastener; the fastener includes a positioning adjusting hole, a snap end, a screw hole and a first adjusting part, the snap end is clamped with the side rail, the screw hole securing the fastener to the side rail through a screw, the fastener upper cover is provided with an upper cover waist-shaped hole, the upper cover waist-shaped hole corresponds to the positioning adjusting hole, the fastener upper cover is provided with a second adjusting part which is matched with the first adjusting part. The upper cover waist-shaped hole is oblong, the connection, position of the positioning adjusting hole can be appropriately adjusted accordingly. The first adjusting part and the second adjusting part are in a rack structure adapted to each other. When connecting, the fastener is first connected to the side rail, then buckle the fastener upper cover to the fastener, so that the first adjusting part and the second adjusting part are clamped together, then the upper cover waist-shaped hole is connected with the positioning adjusting hole by screws to complete the installation of the fixing adjustment assembly. As the upper cover waist-shaped hole is oblong, it can, correspond to the positioning adjusting hole when the fastener upper cover moves within a certain extent, The clamping surfaces of the first adjusting part and the second adjusting part can be triangular, trapezoidal or other shapes, as long as they can be stably clamped. When the layer of leather attached to the supporting frame becomes loose and wrinkled after prolonged use, remove the fastener upper cover, move the fastener upper cover to the side away from the front rail assembly by a suitable distance and then connect the fastener upper cover to the fastener again. Since the rear rail joint is connected with the fastener upper cover, by adjusting the connection position between the fastener upper cover and the fastener, the fastener upper cover will drive the rear rail to move together, making the supporting frame elongated as a whole, thus allowing the layer of leather to be re-stretched, and the snap-end of the fastener to snap into the side rail. The fastener upper cover is placed on the fastener. The upper cover waist-shaped hole and the positioning adjusting hole are screwed together to secure the fastener upper cover and the fastener. The first adjusting part is on the fastener. The relative displacement distance between the fastener upper cover and the fastener is controlled by the adjustment of the gear. The first adjusting part has four gears. The distance between the fastener upper cover and the fastener can be adjusted to lengthen the roll cover to solve the problem that the layer of leather of the cover become loose when it is permanent. The fastener is provided with a screw hole. The screw hole is used to fix the fastener on the side rail by means of, a threading screw.

Further, the rear rail joint is provided with a screw fixing hole, a profile socket, a screw hole and a convex portion, the profile socket is fitted with the rear rail, the profile socket is provided with a screw fixing hole, the screw connects the rear rail joint, with the rear rail through the screw fixing hole; the screw hole is used to pass through a screw, the screw is connected with a locking tongue at one end and a steel wire at the other end; the convex portion is used for engaging with the fastener upper cover, the fastener upper cover is provided with an upper cover concave, the convex portion is, matched with the upper cover concave, the rear rail joint is connected to the rear rail through screws, the position of the rear rail can be adjusted by adjusting the position of the rear rail joint, as the fastener upper cover and the fastener can be adjusted in relative position, the upper cover concave makes the connection between the rear rail joint and the fastener upper cover stable, when the position of the fastener upper cover is adjusted, it can drive the whole rear rail assembly to move as a whole thus adjusting the overall length of the supporting frame, since the rear rail joint is only connected with the rear rail by screws and connected with the side rail mainly by clamping, the side rail will not form an obstacle when the rear rail joint drives the rear rail to move.

Further, the side rail assembly is connected to the cargo hopper through a clamp assembly, the clamp assembly includes a clamping screw, an upper clamp and a lower clamp; the upper clamp includes a positioning groove, a projection plane and a fitting plane, the positioning groove is used to position the side rail, since the cross-section of the side rail is a C-shaped structure, the upper clamp is partially extended into the side rail in order not to tamper with the side rail after connection, in order to adopted to the C-shaped structure of the side rail, a positioning groove is provided on the upper clamp to position the side rail, the convex plane is used to support the side rail and keep the side rail remains horizontal. To prevent the side rails from tilting over time, the side rails are supported horizontally using the convex plane to extend the service life of the side rails, the fitting plane clings to the cargo hopper to ensure the stable connection between the clamp assembly and the cargo hopper. The lower clamp includes a flat top support and a hollow thread, the flat top support is used for abutting the cargo hopper, the hollow thread is used for connecting the clamping screw, the layer of leather is connected to the supporting frame through the Velcro, The upper clamp and the lower clamp functioned collectively to clamp the cargo hopper and the side rail assembly, the upper clamp and the lower clamp are finally connected by a clamping screw to ensure the stability of the side rail assembly, the flat top support sets on the horizontal plane of the side rail, keeping the lower clamp from tilting. The hollow thread is connected to the upper clamp through a clamping screw. The fitting plane clings to the vertical plane of the vehicle side rail. The convex plane also leans against the side rail to keep the upper clamp from tilting. The positioning slot snaps onto the side rail. This upper clamp can conveniently clamp the side rail, and can be disassembled conveniently. A plurality of intermediate bar assemblies are arranged between the two side rails, the intermediate bar assembly includes a intermediate bar and a plug, both ends of the intermediate bar are respectively connected to the side rail through a plug, the plug contacts the side rail to form an intermediate support. In addition, the intermediate bar slightly protruding upwards in the middle, which can jack up the layer of leather of the roll cover to prevent water accumulation after rain.

The beneficial effects of the present invention are:

By providing a fixing adjustment assembly, the invention allows the supporting frame to be properly stretched, effectively avoiding the problem of wrinkling and loosening of the leather after prolonged use.

By providing a clamp assembly, the invention not only ensure the stable connection of the supporting frame, but also make the structure simple and convenient to disassembly and assembly.

Figure 1:
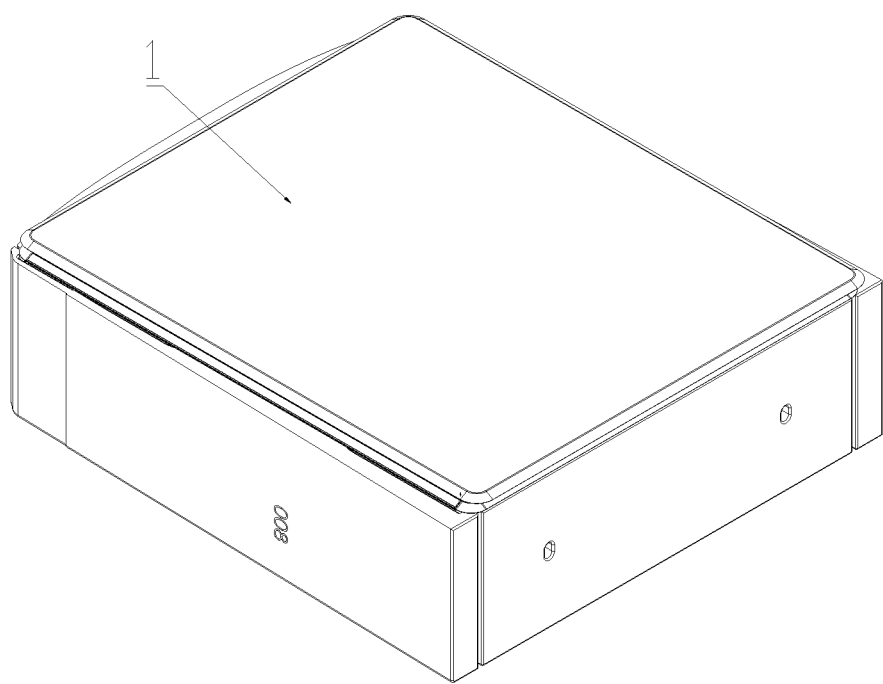
FIG. 1 is the structure schematic diagram 1 of the present invention.
Figure 2:
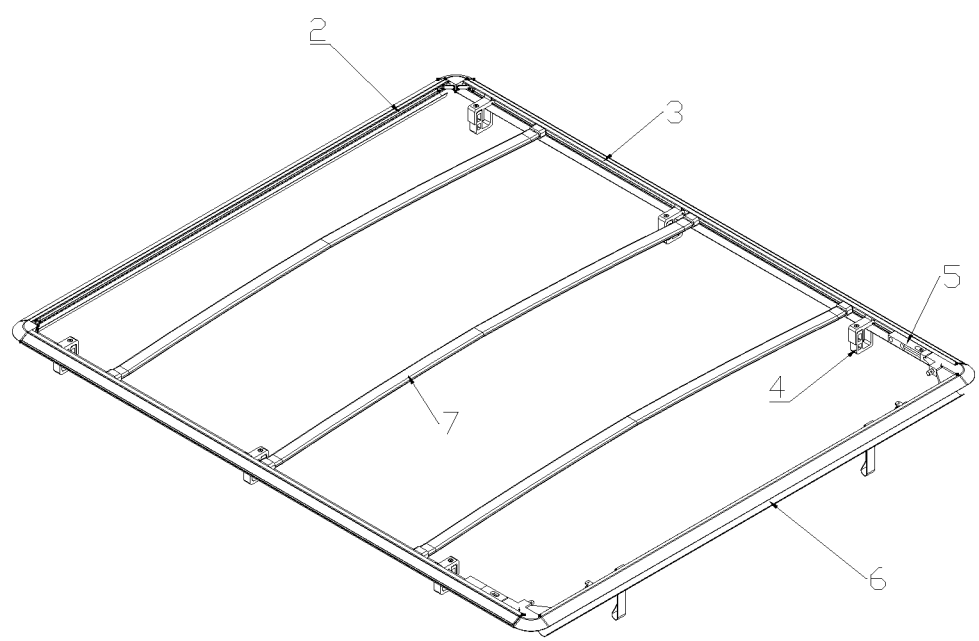
FIG. 2 is the structure schematic diagram 1 of the supporting frame in the present invention.
Figure 3:
FIG. 3 is the structure schematic diagram 2 of the present invention.
Figure 4:
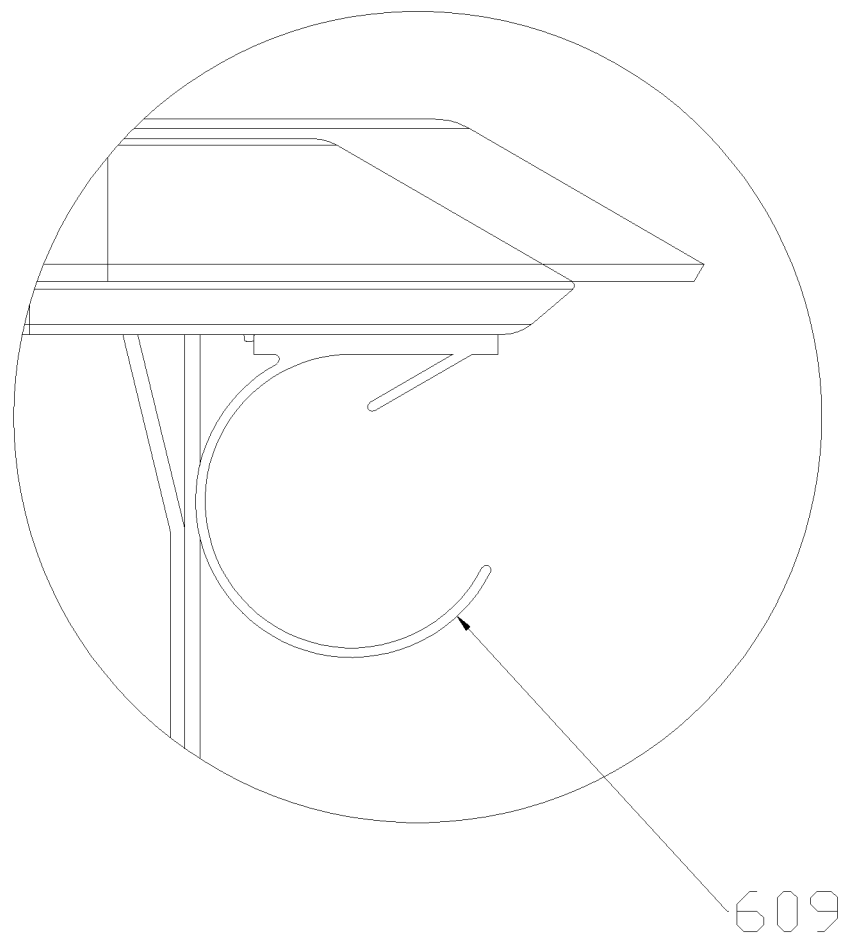
FIG. 4 is the partial enlargement of part A in FIG. 3.
Figure 5:
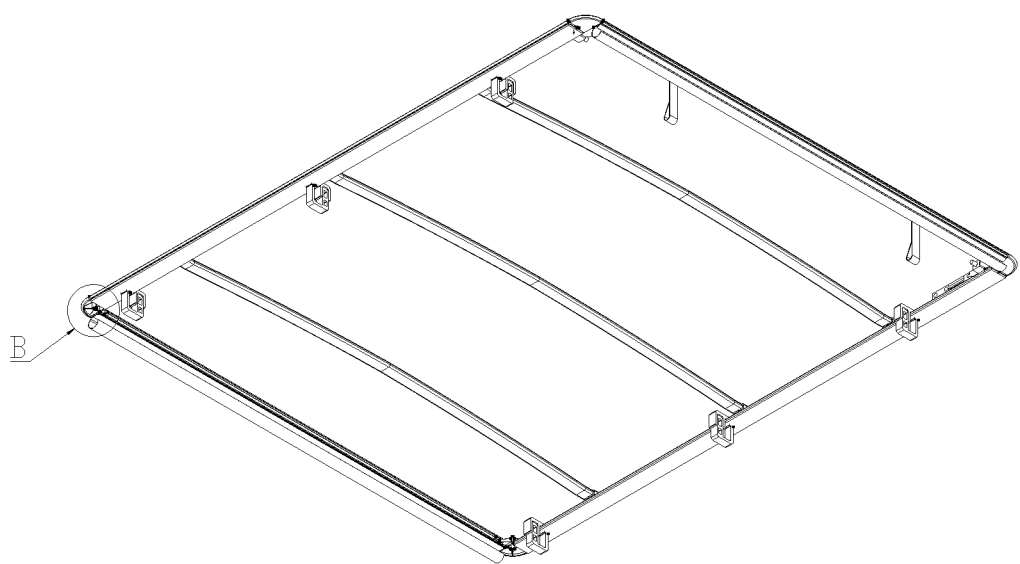
FIG. 5 is the structure schematic diagram 2 of the supporting frame in the present invention.
Figure 6:
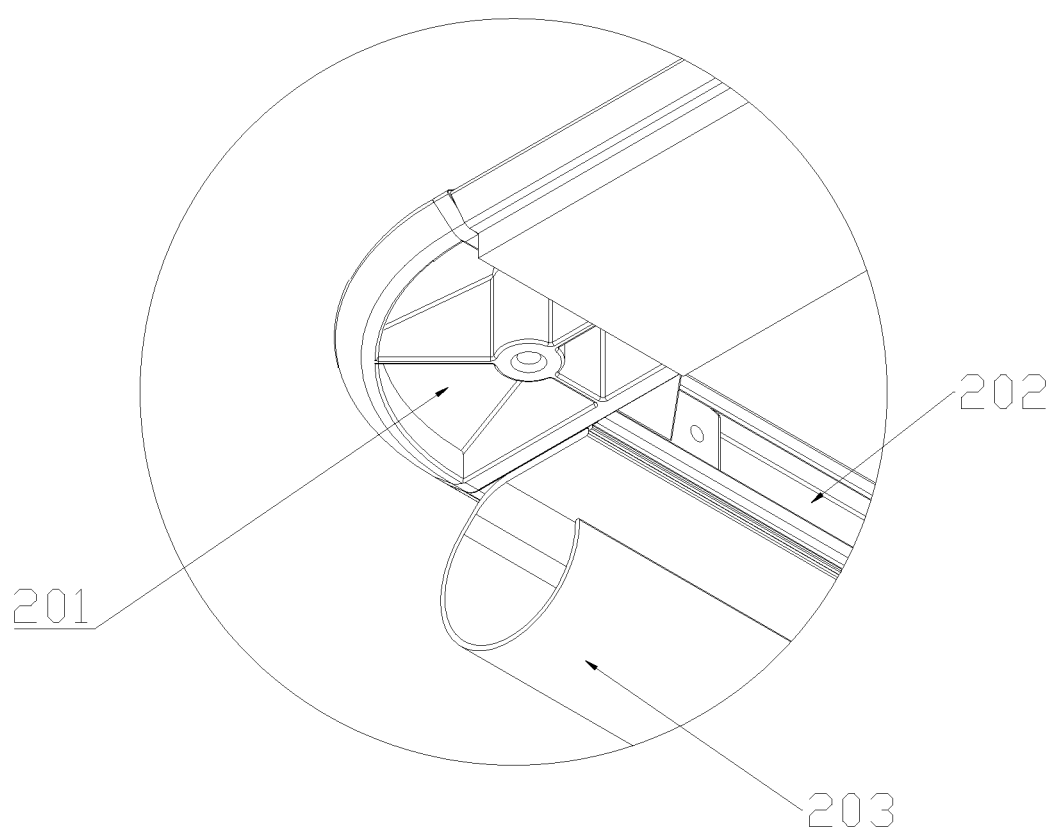
FIG. 6 is the partial enlargement of part B in FIG. 5.
Figure 7:
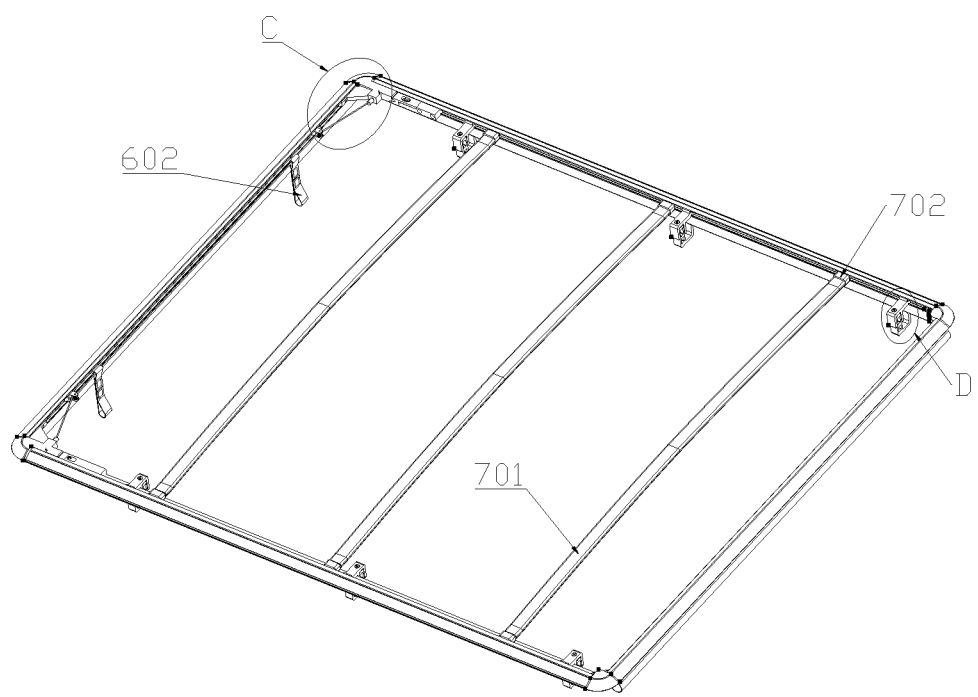
FIG. 7 is the structure schematic diagram 3 of the supporting frame in the present invention.
Figure 8:
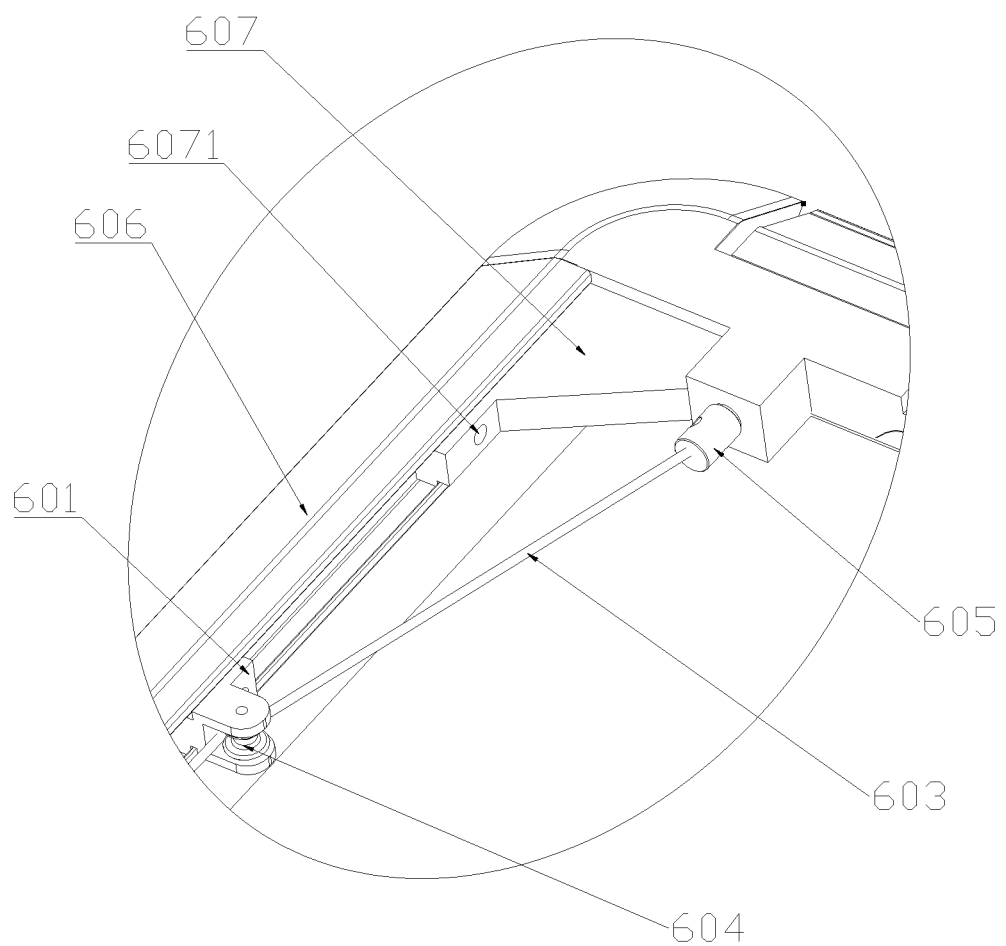
FIG. 8 is the partial enlargement of part C in FIG. 7.

In the picture: 1—Leather; 2—Front rail assembly; 201—Front rail joint; 202—Front rail; 203—Front rail rubber strip; 3—Side rail assembly; 301—Side rail; 302—Velcro; 4—Clamp assembly; 401—Clamping screw; 402—Upper clamp; 4021—Positioning groove; 4022—Convex plane; 4023—Fitting plane; 403—Lower clamp; 4031—Flat top support 4032—Hollow thread; 5—Fixing adjustment assembly; 501—Fastener upper cover; 5012—Upper cover concave; 5013—Upper cover waist-shaped hole; 502—Fastener; 5021—Positioning adjustment hole; 5022—Snap end; 5023—Screw hole; 5024—First adjusting part; 6—Rear rail assembly; 601—Roller fixing block; 602—Pulling rope;

603—Steel wire 604—Roller; 605—Rear rail joint screw; 606—Rear rail; 607—Rear rail joint; 6071—Screw fixing hole; 6072—Profile socket; 6073—Screw hole; 6074—Convex portion; 608—Locking tongue; 6081—Locking tongue inclined plane; 609—Rear rail rubber strip; 7—Intermedium bar assembly; 701—Intermedium bar; 702—Plug The Concrete Method to Carry Out The following instruction further explains the invention's concrete implementation method.

In order to enable a clearer understanding of the objects mentioned above, features and advantages of the present invention, the invention is described in detail below in connection with the accompanying drawings and specific embodiments. It should be noted that the embodiments of the present application and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense; for example, it may be a fixing connection, it can also be a detachable connection or an integral connection; it can be a mechanical connection or an electrical connection; it can be a direct connection or an indirect connection through an intermediate media, and it can be internal connection within two components. For those of ordinary skill in this field, specific meanings of the above terms in the present invention can be understood in specific situations.

The specific embodiments of the present invention will be described in detail below in connection with the accompanying drawings. It should be understood that the specific embodiments described herein are intended only to illustrate and explain the present invention and not to limit it.

Embodiment 1

As shown in FIG. 1, 2, 5-8, an external roll cover for pickup truck, includes a layer of leather 1 and a supporting frame, the layer of leather 1 is connected to the cargo hopper through a supporting frame, the supporting frame includes a front rail assembly 2, a rear rail assembly 6 and a side rail assembly 3, the front rail assembly 2 is connected to the rear rail assembly 6 through a side rail assembly 3.

The front rail assembly 2 includes a front rail 202, a front rail joint 291 and a front rail rubber strip 203, the front rail 202 is connected with the side rail assembly 3 through a front rail joint 201, the front rail 202 is connected with a front rail rubber strip 203.

The front rail joints 201 are connected at both ends of the front rail 202, the front rail rubber strip 203 is stick on the bottom of the front rail 302. The front rail rubber strip 203 is very long which can play a good waterproof effect The rear rail assembly 6 includes a rear rail 606 and a rear rail joint 607, the bottom of the rear rail 606 is connected with a rear rail rubber strip 609, both ends of the rear rail 606 are respectively connected with a rear rail joint 607, the rear rail joint 607 is connected with a locking assembly, the locking assembly includes a locking tongue 608, a pulling rope 602, a roller fixing block 601, a roller 604 and a steel wire 603, the roller 604 is connected to the rear rail 606 through the roller fixing block 601, both ends of the steel wire 603 are respectively connected with a locking tongue 608, the steel wire 603 wound around the roller 604, the steel wire 603 is sleeved with the pulling rope 602, the rear rail assembly 6 is connected with the side rail assembly 3 through the fixing adjustment assembly 5.

Embodiment 2

Figure 13:
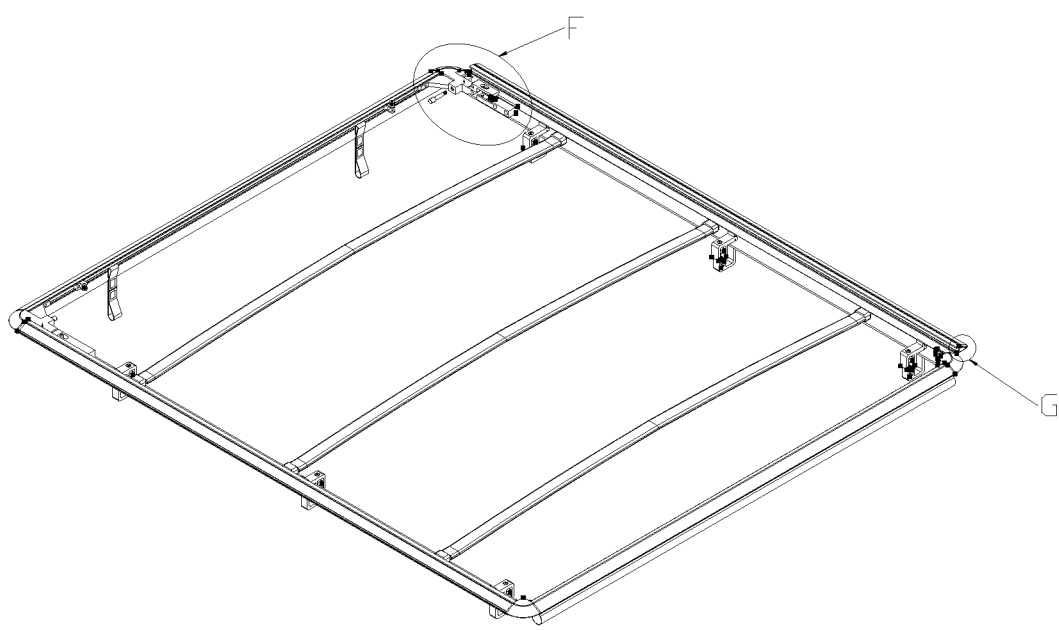
FIG. 13 is the structure schematic diagram 4 of the supporting frame in the present invention.
Figure 14:
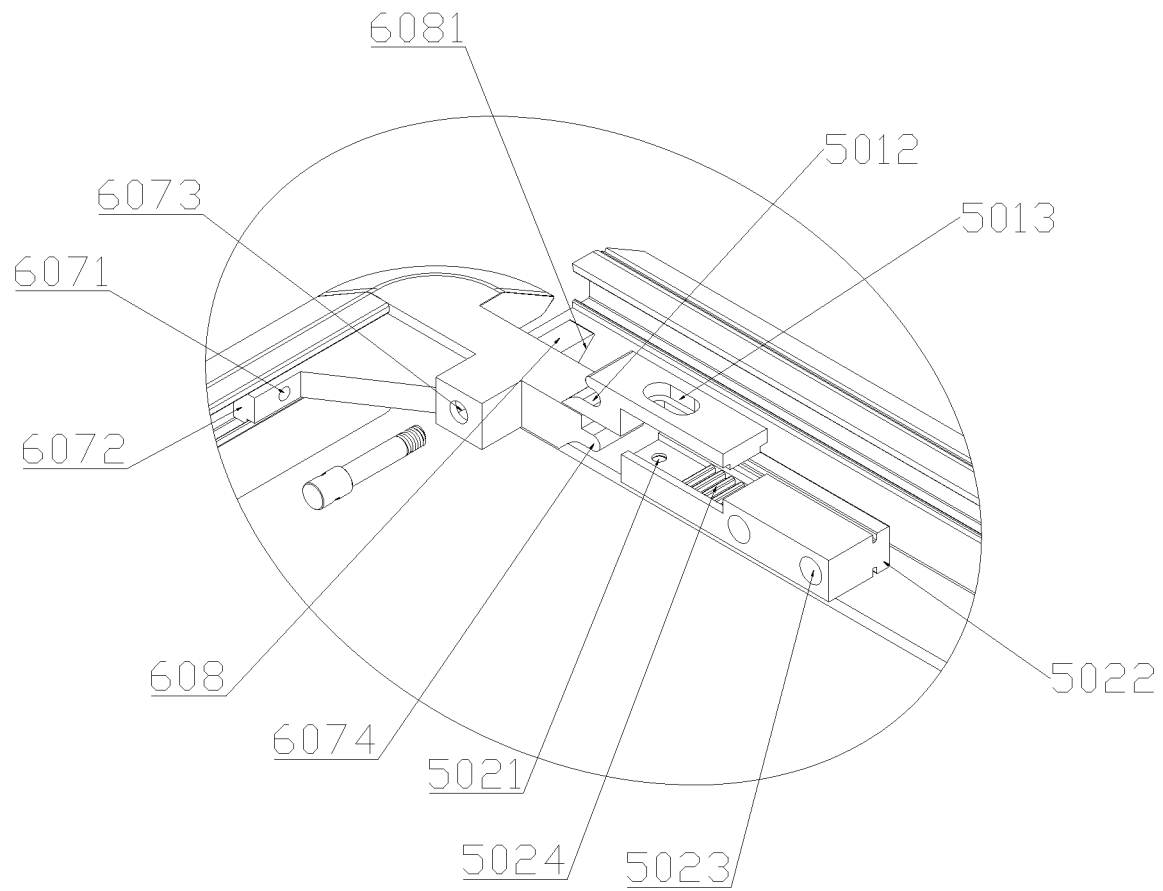
FIG. 14 is the partial enlargement of part F in FIG. 13.

On the basis of Embodiment 1, as shown in FIGS. 13&14, there are two rollers 604 and two pulling ropes 602, the two pulling ropes 602 are arranged between the two rollers 604.

The two rollers 604 guide the installation path of the steel wire 603 to make the steel wire 603 more concealed, the roller 604 and the roller fixing block 601 are rotationally connected, which means, when the steel wire 603 is moving, it will drive the roller 604 to rotate accordingly, so as to avoid friction generated between the steel wire 603 and the roller 604, greatly extending the service life of the steel wire 603. In addition, although two pulling ropes 602 are provided, any one can be pulled during use.

One side of the locking tongue 608 is designed as a inclined plane 6081, by setting the locking tongue 608, steel wire 603 and pulling rope 602, the pulling rope 602 drives two locking tongues 608 to shrink simultaneously through the steel wire 603, which can open the rear rail assembly 6. When closed, only need to press the rear rail assembly 6, because the lower part of the locking tongue 608 is a inclined plane 6081, when the lock tongue inclined plane 6081 contact the side rail 301, it will press the locking tongue 608 back; the locking tongue 608 crosses the side rail 301, then extends under the action of the spring to lock the rear rail assembly 6. By setting the roller 604 and making the steel wire 603 wound around the roller 604, the installation position of the steel wire 603 is limited, making the steel wire 603 closer to the rear rail 606, which is not only beautiful, but also convenient to use. By setting the roller fixing block 601, the roller 604 is fixed on the rear rail 606 to prevent the roller 604 from sliding freely.

The rear rail joint 607 is provided with a screw hole 6073 for fixing the rear rail joint screw 605. The rear rail joint screw 605 are respectively connected with the rear rail 606 and the locking tongue 608. The pulling rope 602 drives the steel wire 603 to pull the rear rail joint screw 605 through the roller 604 to drive the locking tongue 608. When the roll cover is closed, the locking tongue inclined plane 6081 of the locking tongue 608 snaps into the locking tongue contact part of the side rail 301. Because of the spring in the rear rail joint 607, the locking tongue 608 retracts into the rear rail joint 607 and then protrudes out and snaps into the side rail 301. At the same time the convex portion 6074 snaps into the upper cover concave 5012. When the rear rail 606 pulling rope 602 is pulled, the locking tongue 608 is retracted into the rear rail joint 607, the convex portion 6074 leaves the upper cover concave 5012, thereby opening the car cover and realizing the opening and closing of the car cover.

Embodiment 3

Figure 10:
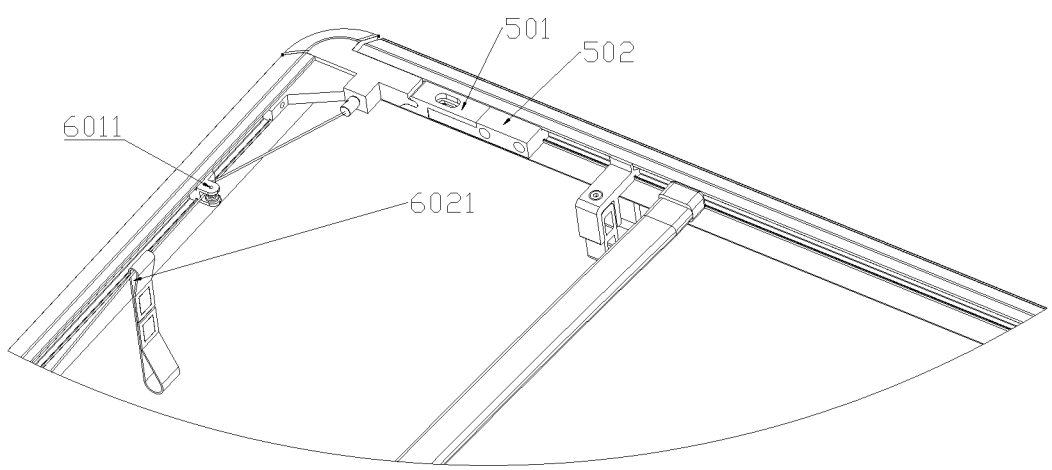
FIG. 10 is the structure schematic diagram of the fixing adjustment assembly in the present invention.
Figure 15:
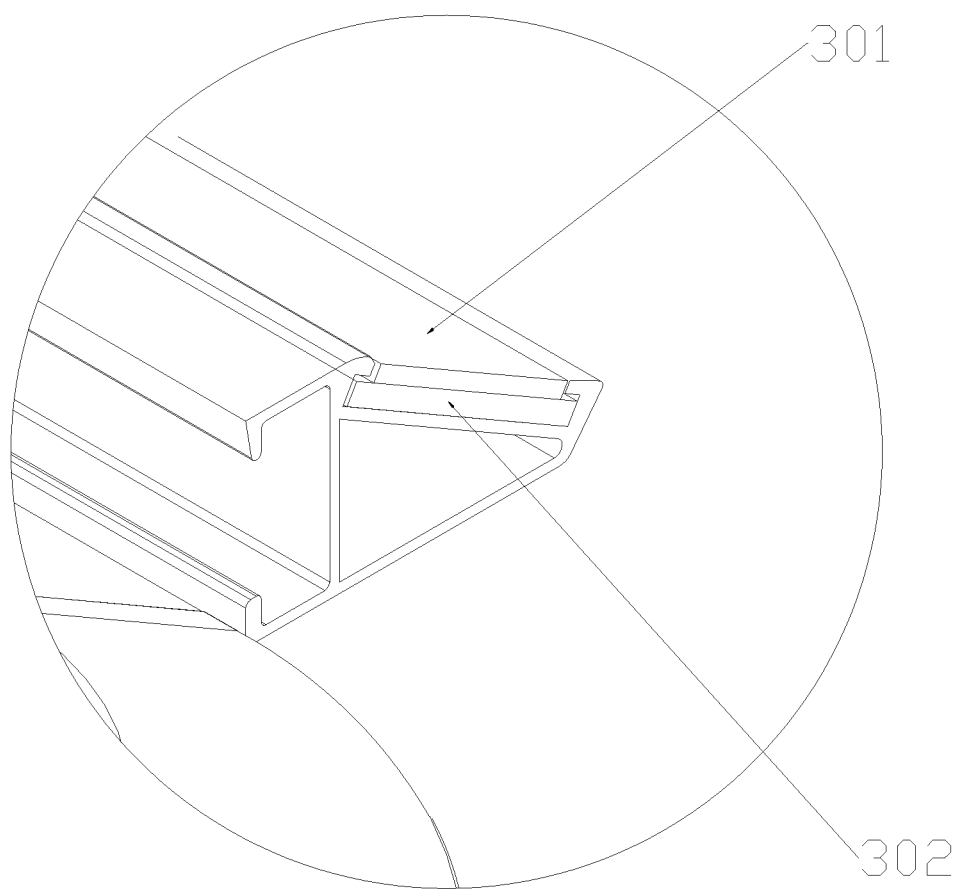
FIG. 15 is the partial enlargement of part G in FIG. 13.

On the basis of Embodiment 2, as shown in FIGS. 10 and 15, the rear rail assembly 6 is connected with a fixing adjustment assembly 5, the fixing adjustment assembly 5 includes a fastener upper cover 501 and a fastener 502.

The fastener 502 includes a positioning adjustment hole 5021, a snap end 5022, a screw hole 5023 and a first adjusting part 5024, the snap end 5022 is clamped with the side rail 301, the screw hole 5023 securing the fastener 502 to the side rail 301 through a screw.

The fastener upper cover 501 is provided with an upper cover waist-shaped hole 5013, the upper cover waist-shaped hole 5013 corresponds to the positioning adjustment hole 5021, the fastener upper cover 501 is provided with a second adjusting part adapted to the first adjusting part 5024.

The upper cover waist-shaped hole 5013 is oblong and the connection position of the positioning adjustment hole 5021 can be appropriately adjusted accordingly.

The first adjusting part 5024 and the second adjusting part are in a rack structure adapted to each other. When connecting, the fastener 502 is first connected to the side rail 301, then buckle the fastener upper cover 501 to the fastener 502, so that the first adjusting part 5024 and the second adjusting part are clamped together, then the upper cover waist-shaped hole 5013 is connected with the positioning adjustment hole 5021 by screws to complete the installation of the fixing adjustment assembly 5. As the upper cover waist-shaped hole 5013 is oblong, the upper cover waist-shaped hole 5013 can correspond to the positioning adjustment hole 5021 when the fastener upper cover moves within a certain extent. The first adjusting part 5024 and the second adjustment part can be triangular, trapezoidal or other shape, as long as they can be stably clamped.

When the layer of leather1 attached to the supporting frame become loose and wrinkled after prolonged use, remove the fastener upper cover 501, move the fastener upper cover 501 to the side away from the front bar assembly 2 by a suitable distance, and then connect the fastener upper cover 501 to the fastener 502 again. Since the rear rail joint 607 is connect with the fastener upper cover 501, by adjusting the connection position between the fastener upper cover 501 and the fastener 502, the fastener upper cover 501 will drive the rear rail 606 to move together, making the supporting frame as a whole elongated, thus allowing the layer of leather1 to be re-stretched.

The snap end 5022 of the fastener 502 snaps into the side rail 301. The fastener upper cover 501 is placed onto the fastener 502, the upper cover waist-shaped hole 5013 and the positioning adjustment hole 5021 are screwed together to secure the fastener upper cover 501 to the fastener 502. The first adjusting part 5024 is on the fastener 502. The relative displacement distance between the fastener upper cover 501 and the fastener 502 is controlled by the gear adjustment. The first adjusting part 5024 has four gears, the distance between the fastener upper cover 501 and the fastener 502 can be adjusted to lengthen the roll cover to solve the problem that the layer of leather 1 of the cover become loose when it is permanent. The fastener 502 is provide with a screw hole 5023. this screw hole 5023 is used to fix the fastener 502 on the side rail 301 by means of a threading screw.

The rear rail joint 607 is provided with a screw fixing hole 6071, a profile socket 6072, a screw hole 6073 and a convex portion 6074.

The profile socket 6072 is-fitted with the rear rail 606 and the profile socket 6072 is provided with a screw fixing hole 6071, the screw connect the rear rail joint 607 with the rear rail 606 through the screw fixing hole.

The screw hole 6073 is used to pass through a screw, the screw is connected with a locking tongue 608 at one end and a steel wire 603 at the other end.

The convex portion 6074 is used for engaging with the fastener, upper cover 501.

The fastener upper cover 501 is provided with an upper cover concave 5012, the convex portion 6074 is matched with the upper cover concave 5012.

The rear rail joint 607 is connected to the rear rail 606 through screws, the position of the rear rail 606 can be adjusted by adjusting the position of the rear rail joint 607.

As the fastener upper cover 501 and the fastener 502 can be adjusted in relative position, the upper cover concave 5012 makes the connection between the rear rail joint 607 and the fastener upper cover 501 stable, when the position of the fastener upper cover 501 is adjusted, it can drive the rear rail assembly 6 to move as a whole, thus adjusting the overall length of the supporting frame.

Since the rear rail joint 607 is only connected with the rear rail 606 by screws and connected with the side rail 301 mainly by clamping groove, the side rail 301 will not form an obstacle when the rear rail joint 607 drives the rear rail 606 to move.

Embodiment 4

Figure 9:
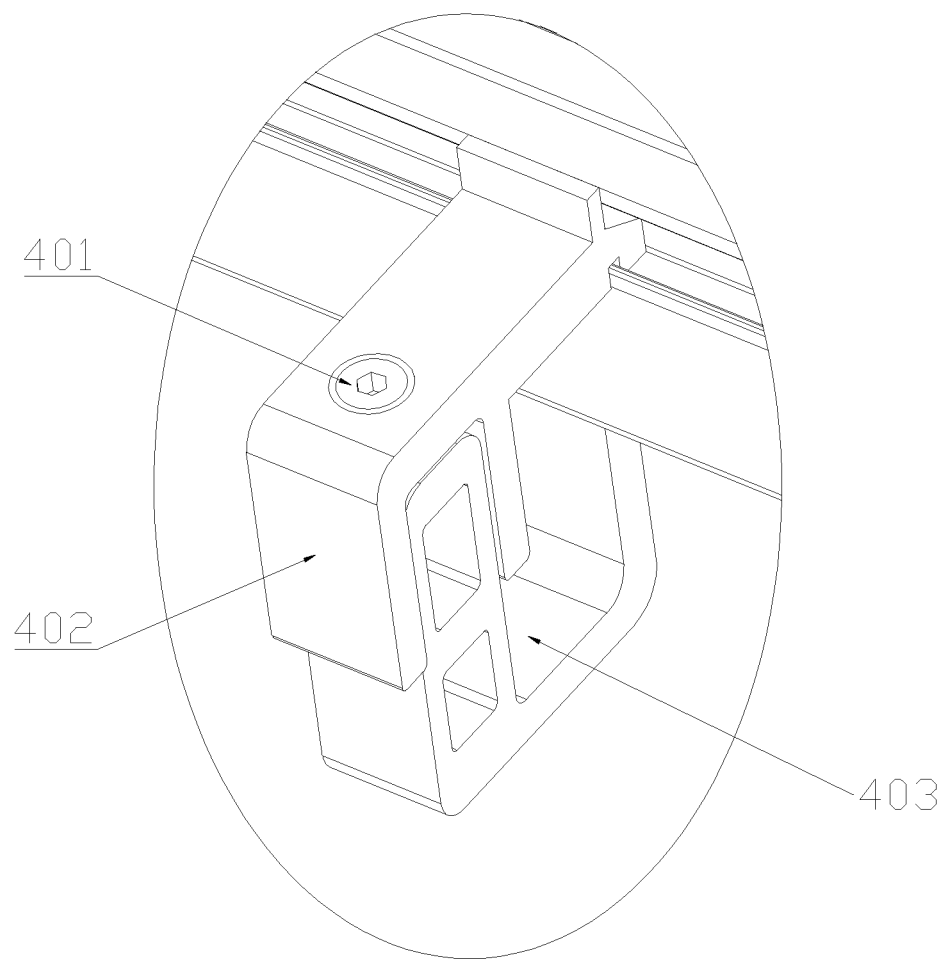
FIG. 9 is the partial enlargement of part D in FIG. 7.
Figure 11:
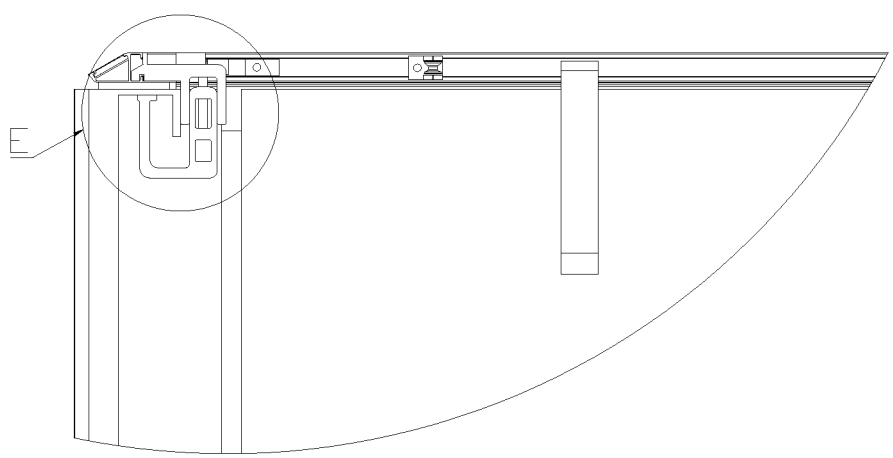
FIG. 11 is the connection schematic diagram of the clamp assembly in the present invention.
Figure 12:
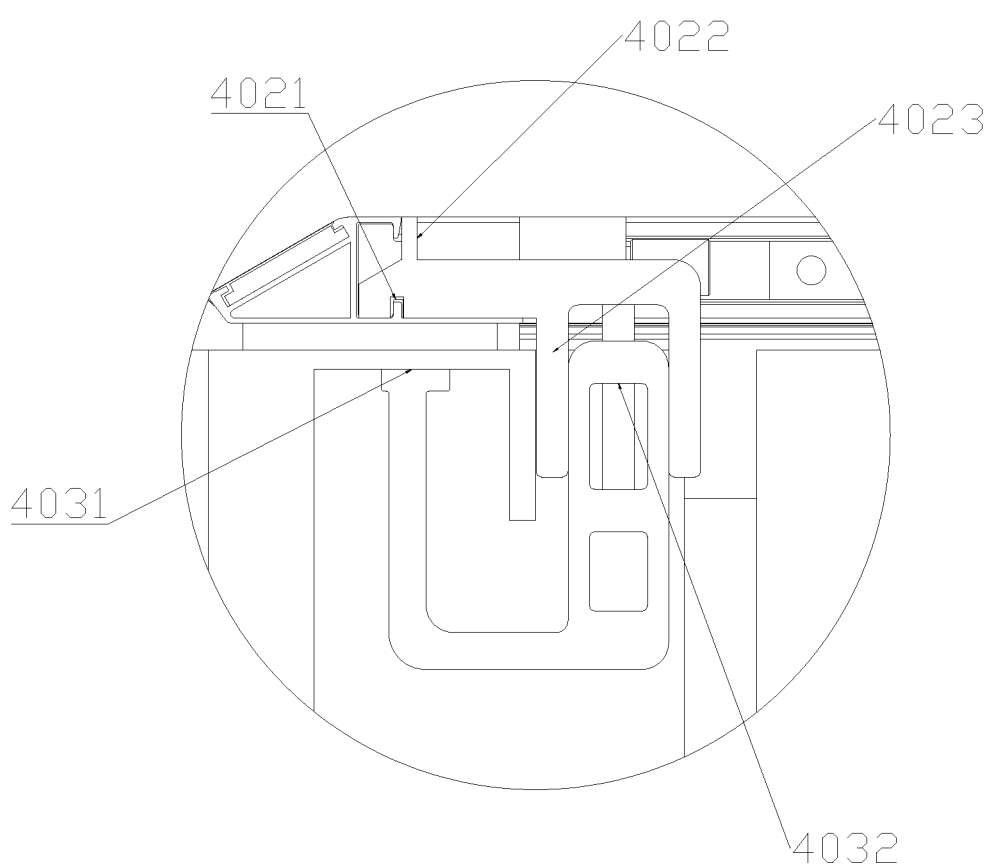
FIG. 12 is the partial enlargement of part E in FIG. 11.

On the basis of Embodiment 3, as shown in FIGS. 9, 11 and 12, the side rail assembly 3 is connected to the cargo hopper through a clamp assembly 4, the clamp assembly 4 includes a clamping screw 401, an upper clamp 402 and a lower clamp 403.

The upper clamp 402 includes a positioning groove 4021, a convex plane 4022 and a fitting plane 4023, the positioning groove 4021 is used to position the side rail 301, since the cross-section, of the side rail 301 is a C-shaped structure, the upper clamp 402 is partially extended into the side rail 301 in order not to tamper with the side rail after connection. In order to adopted to the C-shaped structure of the side rail 301, a positioning groove 4021 is provided on the upper clamp 402 to position the side rail 301, the convex plane 4022 is used to support the side rail 30 1and keep the side rail 301 remains horizontal. To prevent the side rails 301 from tilting over time, the side rails 301 are supported horizontally using the convex plane 4022 to extend the service life of the side rails 301, the fitting plane 4023 is fastened to the cargo hopper to ensure the stable connection between the clamp assembly 4 and the cargo hopper.

The lower clamp 403 includes a flat top support 4031 and an hollow thread 4032, the flat top support 4031 is used for abutting the cargo hopper, the hollow thread 4032 is used for connecting the clamping screw 401.

The layer of leather1 is connected to the supporting frame through the Velcro 302.

The upper clamp 402 and the lower clamp 403 functioned collectively to clamp the cargo hopper to the side rail assembly 3, the upper clamp 402 and the lower clamp 403 are finally connected through clamping screws 401 to ensure the stability of the side rail assembly 3.

The flat top support 4031 sets on the horizontal plane of the car side rail 301, keeping the lower clamp 403 from tilting, the hollow thread 4032 is connected to the upper clamp 402 through a clamping screw 401. the fitting plane 4023 clings to the vertical plane of the vehicle side rail. The convex plane 4022 also leans against the vehicle side rail to keep the upper clamp 402 from tilting. the positioning groove 4021 snaps onto the side rail 301. This upper clamp 402 can conveniently clamp the side rail 301, and can be disassembled conveniently.

A plurality of intermediate bar assemblies 7 are arranged between the two side rails 301, the intermediate bar assemblies 7 includes a intermediate bar 701 and a plug 702, both end of the intermediate bars 701 are respectively connected to the side rails 301 through a plug 702.

The plug 702 contacts the side rail 301 to form an intermediate support. In addition, the middle rod 701 is slightly bent, which can jack up the layer of leather 1 of the roll cover to prevent water accumulation after rain.

The present invention is not limited to the above-mentioned optional embodiment, anyone can produce various other forms under the inspiration of the present invention. However, regardless of changes in its shape or structure, all technical solutions that fall within the scope defined by the claims of the present invention fall within the scope of protection of the present invention.

The invention claimed is:

1. An external roll cover for a pickup truck, comprising: a layer of leather (1) and a supporting frame, wherein the layer of leather (1) is connected to a cargo hopper through the supporting frame, the supporting frame includes a front rail assembly (2), a rear rail assembly (6) and a side rail assembly (3), and the front rail assembly (2) is connected to the rear rail assembly (6) through the side rail assembly (3);

the front rail assembly (2) includes a front rail (202), a front rail joint (201) and a front rail rubber strip (203), wherein the front rail (202) is connected with the side rail assembly (3) through the front rail joint (201), and the front rail (202) is connected with the front rail rubber strip (203);

the rear rail assembly (6) includes a rear rail (606) and rear rail joints (607), wherein both ends of the rear rail (606) are respectively connected with the rear rail joints (607), and the rear rail joints (607) are connected with a locking assembly, wherein the locking assembly includes locking tongues (608), pulling ropes (602), roller fixing blocks (601), rollers (604) and a steel wire (603), the rollers (604) are connected to the rear rail (606) through the roller fixing blocks (601), both ends of the steel wire (603) are respectively connected with the locking tongues (608), the steel wire (603) is wound around the rollers (604), and the steel wire (603) is sleeved with the pulling ropes (602); and the rollers (604) include two rollers (604), the pulling ropes (602) include two pulling ropes (602), and the two pulling ropes (602) are arranged between the two rollers (604).

2. The external roll cover according to claim 1, wherein each of the rear rail joints (607) is provided with a screw hole (6073) for fixing a rear rail joint screw (605); and the rear rail joint screw (605) is connected with both the rear rail (606) and a respective one of the locking tongues (608).

3. The external roll cover according to claim 1, wherein the rear rail assembly (6) is connected with a fixing adjustment assembly (5), and the fixing adjustment assembly (5) includes a fastener upper cover (501) and a fastener (502);

the fastener (502) includes a positioning adjustment hole (5021), a snap end (5022), a screw hole (5023) and a first adjusting part (5024), wherein the snap end (5022) is clamped with the side rail assembly (3), and the screw hole (5023) secures the fastener (502) to the side rail assembly (3) through a screw; and the fastener upper cover (501) is provided with an upper cover waist-shaped hole (5013), the upper cover waist-shaped hole (5013) corresponds to the positioning adjustment hole (5021), and the fastener upper cover (501) is further provided with a second adjusting part adapted to the first adjusting part (5024).

4. The external roll cover according to claim 3, wherein each of the rear rail joints (607) is provided with a screw fixing hole (6071), a profile socket (6072), a screw hole (6073) and a convex portion (6074);

the profile socket (6072) is fitted with the rear rail (606), the profile socket (6072) is provided with the screw fixing hole (6071), and another screw connects the rear rail joint (607) with the rear rail (606) through the screw fixing hole (6071);

the screw hole (6073) is used to allow still another screw to pass therethrough, an end of the still another screw is connected to a respective one of the locking tongues (608), and another end of the still another screw is connected to the steel wire (603); and the convex portion (6074) is used for engaging with the fastener upper cover (501).

5. The external roll cover according to claim 4, wherein the fastener upper cover (501) is further provided with an upper cover concave (5012), and the convex portion (6074) is matched with the upper cover concave (5012).

6. The external roll cover according to claim 1, wherein the side rail assembly (3) is connected to the cargo hopper through a clamp assembly (4), and the clamp assembly (4) includes a clamping screw (401), an upper clamp (402) and a lower clamp (403);

the upper clamp (402) includes a positioning groove (4021), a convex plane (4022) and a fitting plane (4023), the positioning groove (4021) is used to position the side rail assembly (3), the convex plane (4022) is used to support the side rail assembly (3), and the fitting plane (4023) clings to the cargo hopper; and the lower clamp (403) includes a flat top support (4031) and hollow threads (4032), the flat top support (4031) is used for abutting the cargo hopper, and the hollow threads (4032) are used for connecting the clamping screw (401).

7. The external roll cover according to claim 1, wherein the side rail assembly includes side rails (301), a plurality of intermediate bar assemblies (7) are arranged between the side rails (301), each of the intermediate bar assemblies (7) includes an intermediate bar (701) and plugs (702), both ends of the intermediate bar (701) are respectively connected with the side rails (301) through the plugs (702), and the middle of the intermediate bar (701) slightly protrudes upward.

8. The external roll cover according to claim 3, wherein the upper cover waist-shaped hole (5013) is oblong.

9. The external roll cover according to claim 3, wherein the first adjusting part (5024) and the second adjusting part are in a rack structure adapted to each other.

10. The external roll cover according to claim 7, wherein a cross-section of a side rail (301) of the side rails (301) is a C-shaped structure.

* * * * *